March 11, 1958   J. G. IMPARATO   2,826,330
HANDLING AND COUPLING RING FOR CYLINDRICAL MEMBERS
Filed Dec. 16, 1955
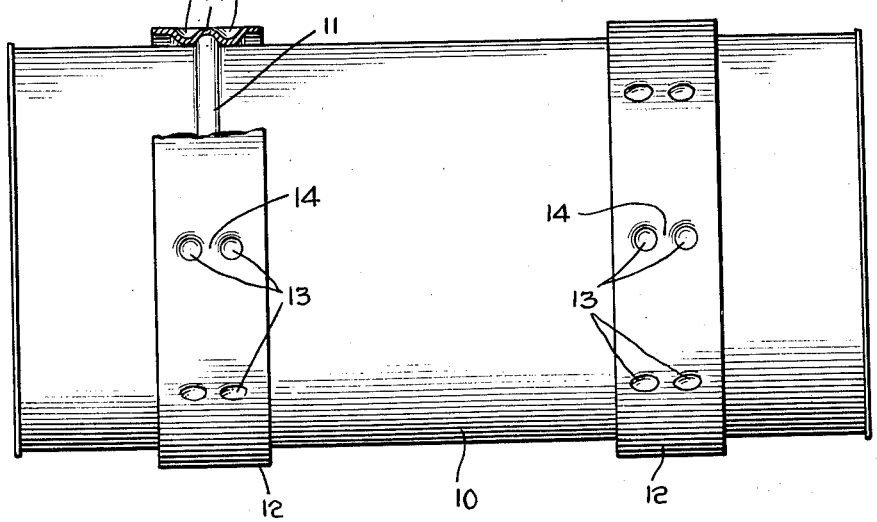
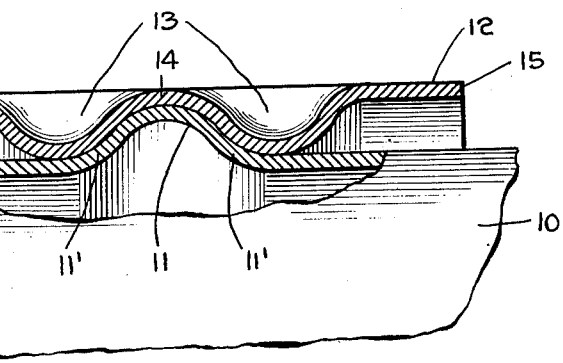
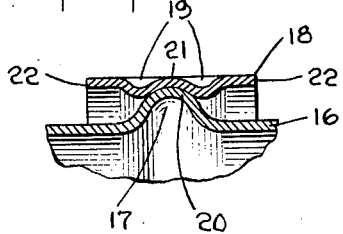
INVENTOR.
JACK G. IMPARATO
BY
*Howard E. Thompson*
ATTORNEY

United States Patent Office 2,826,330
Patented Mar. 11, 1958

2,826,330

HANDLING AND COUPLING RING FOR CYLINDRICAL MEMBERS

Jack G. Imparato, Brooklyn, N. Y., assignor of one-half to John J. Imparato, Brooklyn, N. Y.

Application December 16, 1955, Serial No. 553,558

9 Claims. (Cl. 220—71)

This invention relates to rings adapted to be mounted on cylindrical members such, for example, as drums, cylindrical bottles, containers, projectiles and the like, particularly wherein the cylindrical member includes, on its surface, a bead or projection. More particularly, the invention deals with a ring structure fashioned to form circumferentially spaced pairs of indentures adapted to engage a bead or projection on a cylindrical member in keying a ring or rings on the cylindrical member.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic side view of a cylindrical drum, with two of my improved rings mounted thereon, part of one of the rings being broken away and in section.

Fig. 2 is an enlarged section view, similar to the showing of Fig. 1, illustrating part of the drum, with part in section; and Fig. 3 is a view, similar to Fig. 2, showing a modification.

Fig. 1 of the drawing is a diagrammatic and exaggerated view as to size, particularly in the showing of rings, later described. In this figure, 10 represents a cylindrical drum having spaced annular outwardly extending beads 11, one of the beads being partly shown at the left of Fig. 1. Mounted on these beads are rings 12, which are of identical construction, thus the brief description of one ring will apply to both. The rings 12 are preferably made of strip material and have spaced longitudinally thereof pairs of inwardly extended rounded beads 13 forming, intermediate the beads, a convex bridge portion 14, as clearly noted in Fig. 2 of the drawing.

The beads 13 are disposed inwardly of side edges of the strip material, from which the rings are formed to provide projecting coupling flanges 15, which are spaced from the outer surface of the drum 10 sufficiently to facilitate coupling engagement of a pair of drums having the rings thereon by engaging clamps with the rings of adjacent drums. Coupling clamps of the type and kind disclosed in my prior application Serial Number 387,851, filed October 23, 1953, can be used for this purpose.

The strip material, from which the rings are formed, are cut to predetermined lengths and then ends of the strips are welded together to form the ring structure. In some instances, this operation can be performed directly when the rings are directly mounted on drums which have the beads 11 pre-formed therein. In other instances, the wall of the drum can be expanded to extend the bead such, for example, as the bead 11, into engagement with the adjacent surfaces of the rounded beads 13 and the bridge portion 14 between the beads 13.

With the structure, as shown in Figs. 1 and 2, the beads 13 substantially conform to the contour of the side portions 11′, 11″ of the bead 11, as clearly noted in Fig. 2 of the drawing with the central portion of the beads 13 substantially in alinement with the outer surface of the drum 10.

In Fig. 3 of the drawing, I have shown a modification, in which 16 represents a cylindrical member, which can be generally similar to the drum 10, the member 16 having an annular bead 17 which is formed by expanding the wall of the member 16 into a supported ring 18 for positioning between a pair of inwardly extended beads, or projections 19, the latter being generally similar to the beads or projections 13 on the ring 12, the primary difference between the projections 19 and 13 being that the projections 19 are only slight depressions and conform to the outer peripheral portions 20 of the bead 17, the bridge or crown 21 between the projections 19 engaging the center of the peripheral portion 20. In this connection, as with the structure shown in Figs. 1 and 2 of the drawing, the crown or bridge portion represents the center of the ring which either bears directly upon or is disclosed in close proximity to the high point of the bead, so that, in rolling the drum or other cylindrical member on a surface, the pressure is taken up directly upon the bead, as will be understood. With the structure shown in Figs. 1 and 2 of the drawing, this bearing engagement is extended to a wider area of the bead, as well as the drum, at least where the pairs of projections 13 are located. To simplify the illustration, these pairs of projections are limited in number and, in some instances, can be arranged in close proximity to each other, this being desirable when the rings are applied to drums or cylindrical members of substantial weights.

With the construction shown in Fig. 3, the beads or projections 19 are disposed inwardly of the sides of the ring, so as to provide the coupling side flanges 22, similar to the flanges 15, for clamping engagement of the drums or cylindrical members, as previously stated.

Having fully described my invention, what I claim as new and desire to secure by Letters Patent is:

1. The combination with a cylindrical member having spaced annular beads projecting from the periphery of said member, of rings mounted on the member and encircling said beads, each ring having circumferentially spaced pairs of inwardly extended portions disposed at opposed sides of a bead in positioning the ring on said member and around the bead, and side edges of the ring being spaced from the wall of said member and arranged substantially parallel thereto.

2. The combination with a cylindrical member having spaced annular beads projecting from the periphery of said member, of rings mounted on the member and encircling said beads, each ring having circumferentially spaced pairs of inwardly extended portions disposed at opposed sides of a bead in positioning the ring on said member and around the bead, side edges of the ring being spaced from the wall of said member and arranged substantially parallel thereto, and each pair of inwardly extended portions having adjacent surfaces conforming to the contour of the bead of said member.

3. The combination with a cylindrical member having spaced annular beads projecting from the periphery of said member, of rings mounted on the member and encircling said beads, each ring having circumferentially spaced pairs of inwardly extended portions disposed at opposed sides of a bead in positioning the ring on said member and around the bead, side edges of the ring being spaced from the wall of said member and arranged substantially parallel thereto, each pair of inwardly extended portions having adjacent surfaces conforming to the contour of the bead of said member, and said portions extending onto and engaging the wall of said member adjacent said bead.

4. The combination with a cylindrical member having spaced annular beads projecting from the periphery of said member, of rings mounted on the member and encircling said beads, each ring having circumferentially spaced pairs of inwardly extended portions disposed at opposed sides of a bead in positioning the ring on said member and around the bead, side edges of the ring being spaced from the wall of said member and arranged substantially parallel thereto, each pair of inwardly extended portions having adjacent surfaces conforming to the contour of the bead of said member, said portions extending onto and engaging the wall of said member adjacent said bead, and each of said portions comprising rounded beads disposed inwardly of side edges of said ring.

5. The combination with a cylindrical member having spaced annular beads projecting from the periphery of said member, of rings mounted on the member and encircling said beads, each ring having circumferentially spaced pairs of inwardly extended portions disposed at opposed sides of a bead in positioning the ring on said member and around the bead, side edges of the ring being spaced from the wall of said member and arranged substantially parallel thereto, and said inwardly pressed portions engaging outer peripheral portions only of said bead.

6. A ring mounting on a cylindrical member, said member having a circumferentially continuous outwardly extending projection of curved cross-sectional form, said ring comprising a narrow band, the central portion of the band having means fitting snugly on and conforming to said projection in retaining the band against displacement from said projection, and side portions of the band beyond said means forming transversely straight annular flange portions spaced from and arranged parallel to the walls of said cylindrical member beyond said projection.

7. A ring mounting on a cylindrical member, said member having a circumferentially continuous outwardly extending projection of curved cross-sectional form, said ring comprising a narrow band, the central portion of the band having means fitting snugly on and conforming to said projection in retaining the band against displacement from said projection, side portions of the band beyond said means forming transversely straight annular flange portions spaced from and arranged parallel to the walls of said cylindrical member beyond said projection, and said means including spaced indentures arranged circumferentially of said band.

8. In a cylindrical member, the wall of which has an outwardly projecting circumferential bead intermediate end portions thereof, a ring arranged upon and engaging said bead, said ring comprising a central portion directly conforming with and engaging at least part of the peripheral contour of the bead, the ring having side portions substantially at the peripheral portion of said bead and extending above and below said central portion and arranged substantially parallel to and in spaced relation to the wall of said cylindrical member, and said ring having inwardly pressed portions intermediate the central and side portions thereof.

9. In a cylindrical member, the wall of which has an outwardly projecting circumferential bead intermediate end portions thereof, a ring arranged upon and engaging said bead, said ring comprising a central portion directly conforming with and engaging at least part of the peripheral contour of the bead, the ring having side portions substantially at the peripheral portion of said bead and extending above and below said central portion and arranged substantially parallel to and in spaced relation to the wall of said cylindrical member, said ring having inwardly pressed portions intermediate the central and side portions thereof, and said inwardly pressed portions extending onto the wall of said cylindrical member above and below said bead.

References Cited in the file of this patent

UNITED STATES PATENTS

| | | |
|---|---|---|
| 1,314,445 | Wacker | Aug. 26, 1919 |
| 2,686,610 | Sharpnack | Aug. 17, 1954 |